United States Patent Office 2,824,867
Patented Feb. 25, 1958

2,824,867
COMPLEX COPPER COMPOUNDS OF DISAZO DYESTUFFS

Ernst Keller, Binningen, and Rudolf Dürig, Basel, Switzerland, assignors to J. R. Geigy A. G., Basel, Switzerland, a Swiss firm No Drawing. Application September 6, 1955
Serial No. 532,773

Claims priority, application Switzerland
September 17, 1954

5 Claims. (Cl. 260—148)

The present invention is concerned with disazo dyestuffs and the complex copper compounds thereof, the production and use thereof for the dyeing of cellulose material as well as the material fast dyed with the aid of these dyestuffs.

It has been found that the complex copper compound of disazo dyestuffs having the general formula:

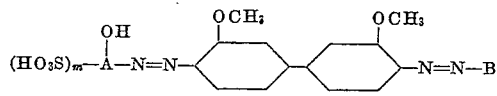

wherein A represents a naphthalene radical bound to the azo group in the ortho-position to the hydroxyl group and being otherwise free from sulphacetylamino groups bound direct to the naphthalene ring, B represents the radical of a hydroxynaphthalene compound bound to the azo group in ortho-position to the hydroxyl group selected from the group consisting of 2-($\omega$-sulphacetylamino)-8-hydroxynaphthalene-6-sulphonic acid, 2-($\omega$-sulphacetylamino)-6-hydroxynaphthalene-8-sulphonic acid, 1-($\omega$-sulphacetylamino)-5-hydroxynaphthalene-7-sulphonic acid, 1-($\omega$-sulphacetylamino)-7-hydroxynaphthalene-3-sulphonic acid, 1-($\omega$-sulphacetylamino)-8-hydroxynaphthalene-4-sulphonic acid, 1-($\omega$-sulphacetylamino)-7-hydroxynaphthalene, and $m$ is one of the integers 1 and 2, are suitable for the fast dyeing of cellulose material in grey-blue to grey shades. These dyestuffs are obtained if a tetrazotised 4.4'-diaminodiphenyl compound containing a substituent capable of forming the metal complex in each of the o-positions to the diazo groups is coupled with 1 mol of each of two different hydroxynaphthalene compounds which couple in the o-position to the hydroxyl group, one of the hydroxynaphthalene compounds containing the radical —NH—CO—CH$_2$—SO$_3$H.

The disazo dyestuffs so obtained are converted into the complex heavy metal compounds advantageously in substance but also they can be converted on the fibre with agents giving off copper.

4.4'-diamino-3.3'-dimethoxy diphenyl is the preferred tetrazo component.

The following compounds are examples of coupling components which contain the characteristic sulphacetylamino group bound direct to the naphthalene ring: 1-sulphacetylamino-7-hydroxynaphthalene, 1-sulphacetylamino-7-hydroxynaphthalene-3-sulphonic acid, 1-sulphacetylamino-8-hydroxynaphthalene-4-sulphonic acid, 1-sulphacetylamino-5-hydroxynaphthalene-7-sulphonic acid, 2-sulphacetylamino-6-hydroxynaphthalene-8-sulphonic acid, 2-sulphacetylamino-8-hydroxynaphthalene-6-sulphonic acid.

Hydroxynaphthalene sulphonic acids coupling in the neighboring position to the hydroxyl group not having the critical sulphacetylamino group are used as further coupling components. These may also contain amino, acylamino or phenylamino groups as further substituents. Examples are: 1-hydroxynaphthalene-3.8- or -4.8-disulphonic acid, 1-hydroxynaphthalene-3.6-disulphonic acid, 1-hydroxynaphthalene-3.6.8-trisulphonic acid, 2-hydroxynaphthalene-3.6-disulphonic acid, 1-7-dihydroxynaphthalene-3-sulphonic acid, 2.8-dihydroxynaphthalene-6-sulphonic acid, 1.8-dihydroxynaphthalene-3.6-disulphonic acid, 1-acetylamino-5-hydroxynaphthalene-7-sulphonic acid, 2-phenylamino-5-hydroxynaphthalene-7-sulphonic acid, 2-benzoylamino-8-hydroxynaphthalene-6-sulphonic acid, 2-acetylamino-8-hydroxynaphthalene-6-sulphonic acid.

The coupling is performed in an alkaline medium; it is of advantage to couple in steps using that coupling component first which produces an easily soluble monoazodiazo compound, i. e. advantageously a hydroxynaphthalene compound sulphonated at the naphthalene nucleus.

The disazo dyestuffs according to the present invention are metallised preferably in substance by treatment with the usual agents giving off copper in aqueous solution or suspension at a raised temperature, for example with copper salts such as copper sulphate, copper chloride, copper acetate, possibly in the presence of inorganic or organic salts such as sodium chloride, sodium acetate, sodium tartrate or with complex salts such as cupritetrammine sulphate. The easily metallisable o.o'-dihydroxyazo dyestuffs according to the present invention can also be metallised on the fibre by treatment with copper salts. The disazo dyestuffs according to the present invention which are coppered in substance are, however, particularly valuable. They are dark powders which, in the form of their alkali salts, dissolve in hot water with a grey-blue to grey color according to the composition and they dye cellulose material in very fast corresponding shades.

In contrast to comparable known copper containing disazo dyestuffs which either do not contain the characteristic sulphacetylamino group which is the subject of the present invention or in which this group is replaced by an acetyl or benzoyl group, the new copper containing disazo dyestuffs are distinguished by a better levelling power on cellulose fibres.

The following examples illustrate the invention without limiting it in any way. Where not otherwise stated, parts are given as parts by weight and the temperatures are in degrees centigrade. The relationship of parts by weight to parts by volume is as that of kilograms to litres.

Example 1

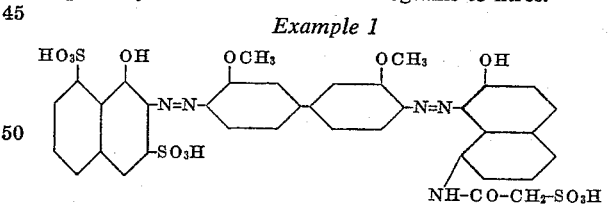

24.4 parts of o-dianisidine are tetrazotised in the usual way and poured at 0–5° into a solution of 30.4 parts of 1-hydroxynaphthalene-3.8-disulphonic acid and 35 parts of sodium carbonate in 1000 parts of water. The diazo-monoazo dyestuff completely precipitates after a short time and no more tetrazonium compound can be traced. A soda alkaline solution of 28.1 parts of 1-($\omega$-sulphacetylamino)-7-hydroxynaphthalene is then added and the whole is stirred until the coupling is complete. The disazo dyestuff obtained in this way is precipitated with sodium chloride, filtered off and again dissolved in 2500 parts of water at 80–85°. 400 parts of ammoniacal copper oxide solution which contains 50 parts of crystalline copper sulphate and 120 parts of concentrated aqueous ammonia, are added and the whole is stirred for 4–5 hours at 80–85°. After the addition of a further 50 parts of concentrated ammonia solution, the whole is heated at 90–95° for a further 15–20 hours. The copper complex formed is precipitated with sodium chloride, filtered off and dried. It is a dark powder which dissolves in water with a grey-blue colour and draws excellently from an aqueous bath onto cotton, linen and regenerated cellulose fibres. The dyeings have very good fastness to light and are hardly influenced in the shade and fastness to light by anti-crease processing.

Similar dyestuffs are obtained if in this example the 1-(ω-sulphacetylamino)-7-hydroxynaphthalene is replaced by 2-(ω-sulphacetylamino)-8-hydroxynaphthalene-6-sulphonic acid, 1-(ω-sulphacetylamino)-8-hydroxynaphthalene-4-sulphonic acid, 1-(ω-sulphacetylamino)-7-hydroxynaphthalene-3-sulphonic acid, 2-(ω-sulphacetylamino)-6-hydroxynaphthalene-8-sulphonic acid, or 1-(ω-sulphacetylamino)-5-hydroxynaphthalene-7-sulphonic acid.

*Example 2*

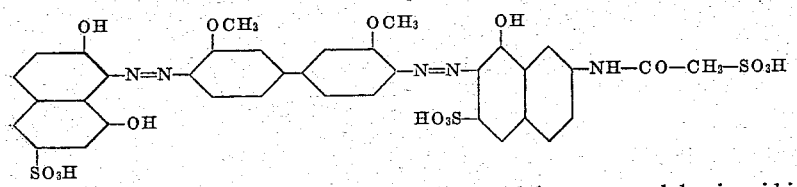

A soda alkaline solution of 36.1 parts of 2-(ω-sulphacetylamino)-8-hydroxynaphthalene-6-sulphonic acid is added to the intermediate compound from 24.4 parts of tetrazotised o-dianisidine and 24.0 parts of 2.8-dihydroxynaphthalene-6-sulphonic acid and the whole is stirred until the coupling is complete. The dyestuff is converted into the copper complex as described in Example 1. The copper containing dyestuff dyes cotton and staple rayon in strong grey-blue shades and the dyeings have very good fastness to light.

If in this example the 2-(ω-sulphacetylamino)-8-hydroxynaphthalene-6-sulphonic acid is replaced by 2-(ω-sulphacetylamino)-8-hydroxynaphthalene-6-sulphonic acid or 1-(ω-sulphacetylamino)-7-hydroxynaphthalene-3-sulphonic acid or 1-(ω-sulphacetylamino)-7-hydroxynaphthalene, then copper containing disazo dyestuffs are obtained which have similar good properties.

*Example 3*

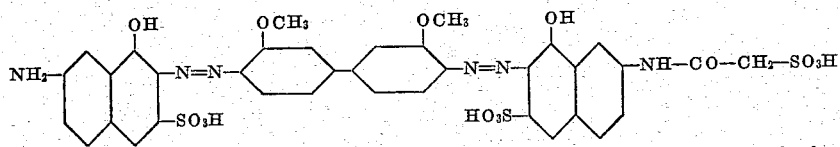

A soda alkaline solution of 36.1 parts of 2-(ω-sulphacetylamino)-8-hydroxynaphthalene-6-sulphonic acid is added to the intermediate product from 24.4 parts of tetrazotised o-dianisidine and 23.9 parts of 2-amino-8-hydroxynaphthalene-6-sulphonic acid and the whole is stirred until the coupling is complete. The copper complex compound which is obtained by the method described in Example 1, dyes cotton and staple rayon direct in grey shades. The dyeings have very good fastness to light.

Other similar dyestuffs are obtained if, instead of 2-amino-8-hydroxynaphthalene-6-sulphonic acid, 2-benzoylamino-8-hydroxynaphthalene-6-sulphonic acid or 1-acetylamino-5-hydroxynaphthalene-7-sulphonic acid is used.

A copper containing disazo dyestuff which also dyes cellulose material in fast grey shades is obtained if 1-(ω-sulphacetylamino)-8-hydroxynaphthalene-4-sulphonic acid or 1-(ω-sulphacetylamino)-5-hydroxynaphthalene-7-sulphonic acid or 1-(ω-sulphacetylamino)-7-hydroxynaphthalene are used instead of 2-(ω-sulphacetylamino)-8-hydroxynaphthalene-6-sulphonic acid.

*Example 4*

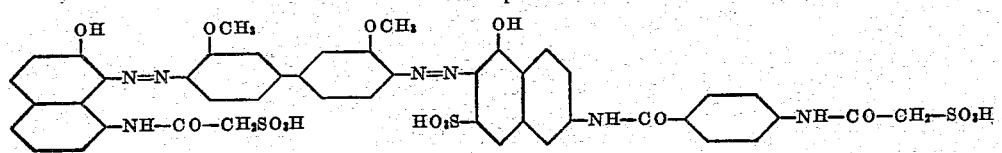

A soda alkaline solution of 48 parts of 2-(4'-ω-sulphacetylamino-benzoylamino)-5-hydroxynaphthalene-7-sulphonic acid is poured into the intermediate compound from 24.4 parts of tetrazotised o-dianisidine and 28.1 parts of 1-(ω-sulphacetylamino)-7-hydroxynaphthalene and the whole is stirred until the coupling is complete. The copper complex compound obtained therefrom according to the method described in Example 1 dyes cellulose material direct in blue-grey shades. The dyeings have very good fastness to light.

If in this example the 1-(ω-sulphacetylamino)-7-hydroxynaphthalene is replaced by 2-(ω-sulphacetylamino)-8-hydroxynaphthalene-6-sulphonic acid or if 2-(4'-ω-sulphacetylamino-phenylamino)-5-hydroxynaphthalene-7-sulphonic acid is used instead of 2-(4'-ω-sulphacetylamino-benzoylamino)-5-hydroxynaphthalene-7-sulphonic acid and otherwise the same procedure is followed, then copper containing disazo dyestuffs are obtained which have the same good properties.

*Example 5*

2 parts of dyestuff obtained according to Example 1 are dissolved in a dyebath containing 3000 parts of water and 2 parts of sodium carbonate. 100 parts of cotton are entered at 40–50°, the bath is heated within 30 minutes to 90–95°, 30 parts of sodium sulphate are added and dyeing is continued at this temperature for 45 minutes. After this time, the dyed goods are rinsed cold in the usual way and dried. The cotton is dyed in vivid grey-blue shades. The dyeing has good wet fastness and very good light fastness properties.

What we claim is:
1. The complex copper compound of a disazo dyestuff having the general formula:

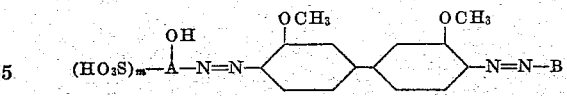

wherein A represents a naphthalene radical bound to the azo group in ortho-position to the hydroxyl group and being otherwise free from sulphacetylamino groups bound direct to the naphthalene ring, B represents the radical of a hydroxynaphthalene compound bound to the azo group in ortho-position to the hydroxyl group selected from the group consisting of 2-(ω-sulphacetylamino)-8-hydroxynaphthalene-6-sulphonic acid, 2-(ω-sulphacetylamino)-6-hydroxynaphthalene-8-sulphonic acid, 1-(ω-sulphacetylamino)-5-hydroxynaphthalene-7-sulphonic acid, 1-(ω-sulphacetylamino)-7-hydroxynaphthalene-3-sulphonic acid, 1-(ω-sulphacetylamino)-8-hydroxynaphthalene - 4 - sulphonic acid, 1-(ω-sulphacetylamino)-7-hydroxynaphthalene, and $m$ is one of the integers 1 and 2.

5. The complex copper compound of a disazo dyestuff having the formula:

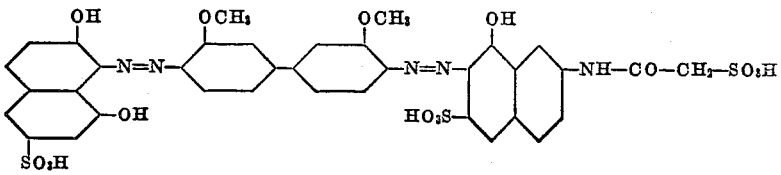

2. The complex copper compound of a disazo dyestuff having the formula:

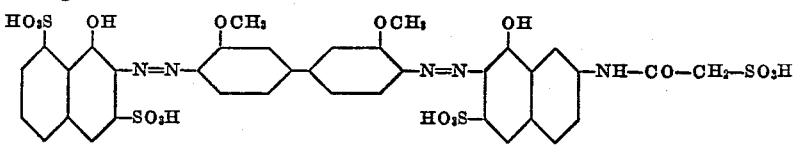

3. The complex copper compound of a disazo dyestuff having the formula:

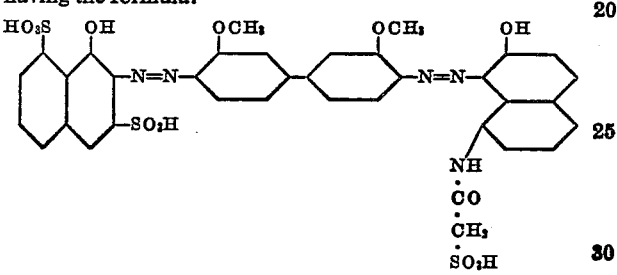

4. The complex copper compound of a disazo dyestuff having the formula:

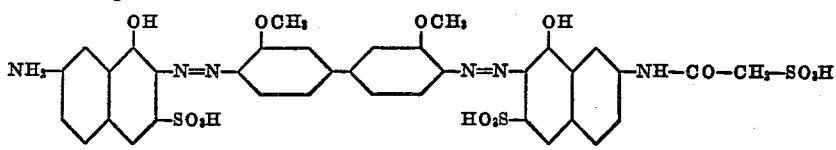

References Cited in the file of this patent
UNITED STATES PATENTS

| | | |
|---|---|---|
| 2,620,331 | Wehrli | Dec. 2, 1952 |
| 2,720,518 | Buehler | Oct. 11, 1955 |

FOREIGN PATENTS

| | | |
|---|---|---|
| 268,766 | Switzerland | Sept. 16, 1950 |